United States Patent

[11] 3,590,292

[72] Inventor Theodore E. Poliakoff
 Alexandria, Va.
[21] Appl. No. 880,816
[22] Filed Nov. 28, 1969
[45] Patented June 29, 1971
[73] Assignee American Machine & Foundry Company

[54] ELECTRIC MOTOR CONSTRUCTION
 7 Claims, 4 Drawing Figs.
[52] U.S. Cl. ................................................. 310/90,
 310/91
[51] Int. Cl. ................................................. H02k 5/16
[50] Field of Search ........................................ 310/90, 91,
 85, 88, 89, 42

[56] References Cited
 UNITED STATES PATENTS
2,871,384 1/1959 Gabriel ........................ 310/90
3,167,672 1/1965 Tupper ........................ 310/90
3,270,226 8/1966 McMillan ..................... 310/91
3,483,409 12/1969 Phillips ......................... 310/90
3,497,735 2/1970 Diederichs .................... 310/90
3,500,084 3/1970 Ito ................................ 310/91
3,500,087 3/1970 Wendt .......................... 310/90

Primary Examiner—Milton O. Hirshfield
Assistant Examiner—R. Skudy
Attorneys—George W. Price and Charles J. Worth ABSTRACT: In an electric motor with a rotor and shaft fixed for rotation in unison and a U-shaped bracket connected to each side of the stator, the bight portion of each bracket having a deformation and opening therethrough substantially aligned axially with the deformation and opening of the other bracket and the rotor bore of the stator. Bearing arrangement for the shaft on both sides of the rotor each having an end portion of similar shape and engaging one of the deformations and being connected thereto by an epoxy so the bearing arrangement retains the rotor in alignment with the rotor bore.

PATENTED JUN 29 1971 3,590,292
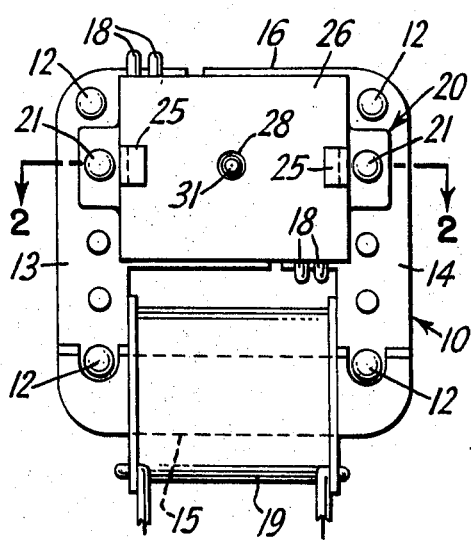
FIG. 1
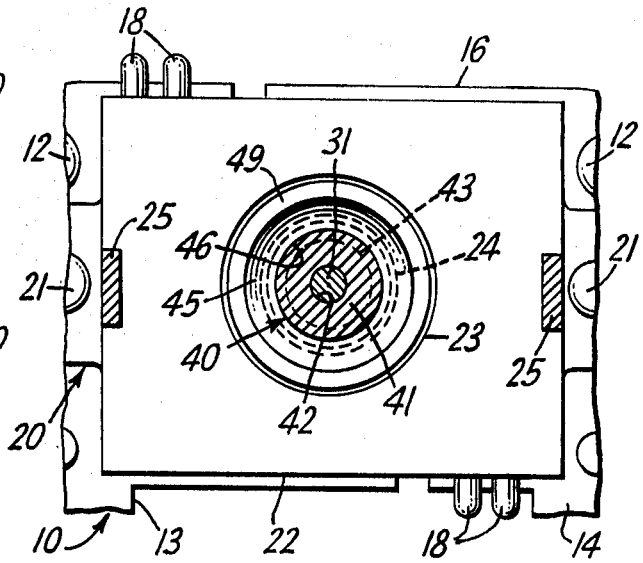
FIG. 3
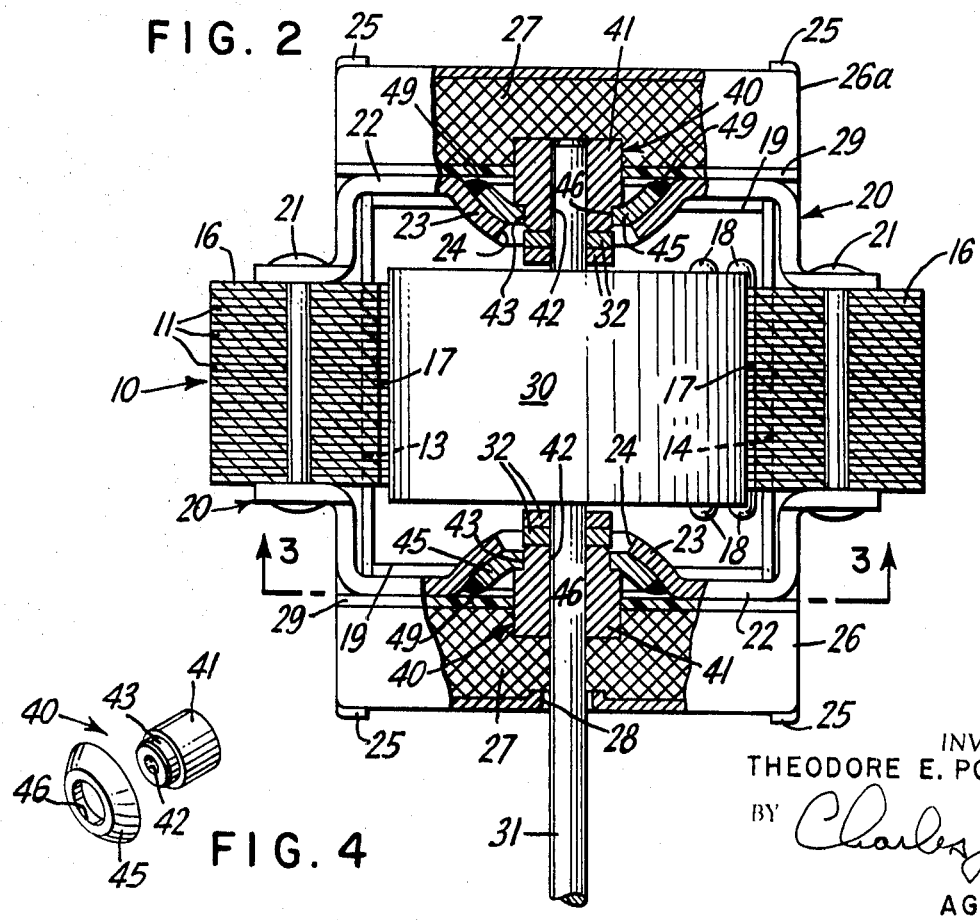
FIG. 2
FIG. 4
INVENTOR
THEODORE E. POLIAKOFF
BY Charles J. Wortz
AGENT

ELECTRIC MOTOR CONSTRUCTION

This invention relates generally to electric motors and more particularly for providing means to rotatably support the rotor in alignment in a bore of the stator thereof.

While the present invention can find utility in various types of motors, it is particularly adapted to the general class of motor shown and described in U.S. Pat. No. 2,245,433 granted June 10, 1941 to J. Delmonte or U.S. Pat. No. 3,070,409 granted Dec. 25, 1962 to O. E. Jakel, and will be so described in such an environment.

An object of the present invention is to provide means for mounting and retaining a rotor in an opening in the stator of an electric motor with a constant air gap.

Another object of the present invention is to provide the foregoing motor construction in which the rotor and rotor shaft connected together to move in unison in bushing type bearings.

And another object of the present invention is to provide the foregoing motor construction in which each bearing is disposed on a different side of the rotor and is provided with a wick or packing type lubricant reservoir.

The foregoing and other objects and advantages will appear more fully hereinafter from a consideration of the detailed description which follows, taken together with the accompanying drawing wherein one embodiment of the invention is illustrated by way of example. It is to be expressly understood, however, that the drawing is for illustration purposes only and is not to be construed as defining the limits of the invention.

FIG. 1 is an elevational view of a motor made in accordance with the present invention.

FIG. 2 is an enlarged sectional view taken on line 2-2 of FIG. 1.

FIG. 3 is a fragmentary sectional view taken on line 3-3 of FIG. 2.

FIG. 4 is an exploded perspective view of one of the bearing assemblies of the motor of FIG. 1.

Referring now to the drawings, a motor, in accordance with the present invention, is provided with a stator 10 of a plurality of laminations or plates 11, of a magnetic material, connected together by a plurality of fasteners 12 such as rivets, as shown. The stator 10 has a main or bridge portion 16 with a pair of side or lateral portions or legs 13 and 14 which extend substantially parallel to one another from opposite ends of the main or bridge portion. The stator 10 also has a separate transverse leg or portion 15 connected at its ends by two of the fasteners 12 to the free ends of the side legs 13 and 14, and are spaced by such lateral portions from the main or bridge portion 16.

A field coil 19 is mounted on the transverse leg or portion 15 between the side or lateral legs or leg portions 13 and 14. The main or bridge portion 16 has a centrally located rotor bore 17 through all of the laminations 11 and is provided with one or more sets of shading rings 18 which are disposed diagonally from one another across the bore 17 in the usual manner.

A pair of U-shaped brackets 20 are provided, each being disposed on a different side of the stator 10 and having a pair of flanged legs connected thereto by fasteners such as rivets 21. The bight portion 22 of each bracket 20 is spaced by the flanged legs thereof from the stator 10, and is provided with a centrally located seat surface formed by a deformation or cup portion 23 with a central opening 24 therethrough. The deformations or cup portions 23, which provide spherical seat surfaces, and the openings 24 through such seat surfaces of both brackets 20 are substantially aligned axially with the rotor bore 17 of the stator 10.

A rotor 30 is disposed in the bore 17 and is provided with a shaft 31 which is fixed thereto for rotation in unison with the rotor. The shaft 31 extends outwardly from both sides of the rotor 30 and through the openings 24 of the brackets 20. A pair of bearing assemblies 40 are each connected to a different one of the brackets 20 for rotatably supporting both ends of the shaft 31 thereby maintaining the rotor 30 in axial alignment in the rotor bore 17.

Each bearing assembly 40 is comprised of a bushing 41 having a through bore 42 for the rotor shaft and a reduced end portion 43 that is press fitted into a central opening 46 through a spherical mounting disc or flange member 45. If necessary, the press fitted connection between the bushing 41 and disc 45 may be staked or otherwise strengthened in any suitable manner known in the art.

With the rotor 30 in axial alignment in the bore 17, so the air gap between the circular periphery of the rotor and the wall of the bore is constant through, the bearing assemblies 40 are moved on the shaft 31 until the spherical discs of flange members 45 engage the spherical cups 23 of brackets 20. A ring of epoxy 49 is provided to lock each bearing assembly 40 to the adjacent bracket 20. One or more shims or spacers 32 may be provided, as required, on the shaft 31 between each side of the rotor 30 and the inner end of the adjacent bearing assembly 40 to limit the possible axial movement of the rotor relative to the stator 10.

While it is preferred to have the cup portions 23 of the brackets 20 deformed inwardly toward the stator 10 and each bushing 41 disposed on the concave side of the disc 45 to which it is attached, the cup portions alternatively could be deformed away from the stator and each bushing would then have to be on the convex side of the disc to which it is attached. It should be understood that the disc or flange members 45, which form end portions of the bearing assemblies 40, are to be similar in shape to the seat surfaces provided by the deformations or cup portions 23 of the brackets 20.

To keep the shaft 31 and bushings 41 lubricated, each of the brackets 20 is provided with fastening means which, in this instance, are in the form of clamping fingers 25. It should be understood, although not shown, that any suitable threaded fasteners or clips could be used in lieu of the fingers 21. The lubricant reservoir on the side of motor with the output or drive end of the shaft 31 is formed by a hollow rectangular case 26, of any suitable material, which is filled with a lubricant saturated wick or fibrous material 27. The side of the case 26 adjacent to the bracket 20 is open and is provided with a seal or gasket 29 while the opposite side of the case is provided with an opening 28 for the shaft.

The lubricant reservoir on the other side of the motor differs from that described by having a modified case 26a which merely lacks the opening 28 because it is not required. However, case 26 would be used in place of the case 26a if both ends of the shaft 31 were adapted for connection.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

I claim:

1. In an electric motor having a through bore, and a rotor axially aligned in said bore and having a through shaft connected to and rotatable with said rotor, the combination comprising:

a pair of bracket means each connected to a different side of the stator, each of said bracket means having a seat surface and an opening for said shaft therethrough substantially aligned axially with said bore of said stator and said seat surface and opening therethrough of the other of said bracket means, bearing means for said shaft disposed on each side of said rotor each having an end portion engaging the seat surface of one of said bracket means and being similar in shape to the seat surface said end portion engages, and epoxy connecting said end portions to said bracket means for immovably locking said bearing means to said bracket means.

2. The electric motor in accordance with claim 1, and a pair of reservoirs each connected to one of said bracket means and enclosing the end of said bearing means opposite from the end connected to the same bracket means.

3. The electric motor in accordance with claim 1, wherein each of said bracket means is a U-shaped bracket having a pair of leg portions connected to said stator and a bight portion spaced from said stator by said leg portions, and said bight portion having a spherical deformation providing said seat surface.

4. The electric motor in accordance with claim 1, and each of said bearing means comprising:
a bushing, and
flange means at one end of said bushing providing said bearing means end portion connected to said seat surface.

5. The electric motor in accordance with claim 4, wherein said flange means is a disc connected to the end of said bushing.

6. The electric motor in accordance with claim 5, wherein said disc is substantially spherical,
each of said bracket means is a U-shaped bracket having a pair of leg portions connected to said stator and a bight portion spaced from said stator by said leg portions, and
said bight portion having a spherical deformation providing said seat surface.

7. The electric motor in accordance with claim 6, and
a pair or reservoirs each connected to one of said bracket means and enclosing the end of said bearing means opposite from the end connected to the same bracket means.